United States Patent [19]

Otoguro

[11] 4,305,345
[45] Dec. 15, 1981

[54] PROCESS FOR THE MANUFACTURE OF PULP CONTAINED PARTICLES FOR THE TREATMENT OF EXCREMENT

[76] Inventor: Masaaki Otoguro, 448-1, Yagusu, Yaizu-shi Shizuoka-ken, Japan

[21] Appl. No.: 148,667

[22] Filed: May 12, 1980

[51] Int. Cl.³ ............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 3,828,731 | 8/1974 | White | 119/1 |
| 3,980,050 | 9/1976 | Neubauer | 119/1 |
| 4,203,388 | 5/1980 | Cortigene et al. | 119/1 |

Primary Examiner—Hugh R. Chamblee
Attorney, Agent, or Firm—Wenderoth, Lind & Ponack

[57] ABSTRACT

A process for the manufacture of paper pulp containing particles for the treatment of excrement of primarily domestic animals and pets. Hot water and a filler are added to a paper pulp in solidified condition and they are agitated so as to form a slurry of the paper pulp. The slurry is subjected to a first dehydration and lumps of the pulp are produced which are subsequently cut into a plurality of smaller lumps. The smaller lumps are then rolled and become coarse particles which are dehydrated once again. The dehydrated particles are rotated and finally dried. The resultant particles are of high density and absorb water. The particles are also water-soluble so that, after use, they can be flushed down a toilet.

3 Claims, 7 Drawing Figures

PROCESS FOR THE MANUFACTURE OF PULP CONTAINED PARTICLES FOR THE TREATMENT OF EXCREMENT

SUMMARY OF THE INVENTION

This invention relates to a process for the manufacture of paper pulp containing particles for the treatment of excrement primarily of domestic animals, pets, namely, dried paper pulp containing particles produced from the small pulp lumps.

A proper amount of the particles is placed on the bottom portion of a box (chamber pot) for domestic animals or pets, and when the domestic animals pass urine in the box, the urine is absorbed into the inner part of the particles, and the absorbed portion of the particles are solidified without being dispersed. Accordingly, absorbed portion only is taken out, and the excrement contained particles can be flushed down the toilet. As described in the foregoing, the particles are convenient excrement treating materials.

The paper pulp constituting the particles can be obtained in platelike or lumplike form in the paper mill. However, heretofore, as far as the inventor is concerned, there has been disclosed no process for the manufacture of the pulp containing dried particles from the platelike or lumplike pulp. By the way, it is easy to mold the powder like material into particles, but fibrous material is difficult to mold into the particles.

A first object of this invention is to provide a process for the manufacture of the pulp containing particles from the plate like or lump like pulp as a result of years of research conducted by the inventor.

A second object of this invention is to provide a process for the granulation of paper pulp containing particles to produce extremely fine quality particles.

A third object of this invention is to provide a process for the manufacture of paper pulp containing particles which retain the original form even though they are wet.

A fourth object of this invention is to provide a process for the manufacture of paper pulp containing particles which absorb the water and retain it.

A fifth object of this invention is to provide paper pulp containing particles which do not stick to legs of domestic animals, or pets.

A sixth object of this invention is to provide a process for the manufacture of paper pulp containing particles which have water solubility and can be flushed down the toilet.

BRIEF DESCRIPTION OF THE DRAWINGS

Although these objects can be achieved by this invention, the concrete examples are illustrated in the following by referring to the attached drawings and the detailed description of this invention.

By the way, any amendments or modifications related to the details of structure shall be understood to be included within the scope of the appended claims.

DETAILED DESCRIPTION OF THE INVENTION

Figure 1:
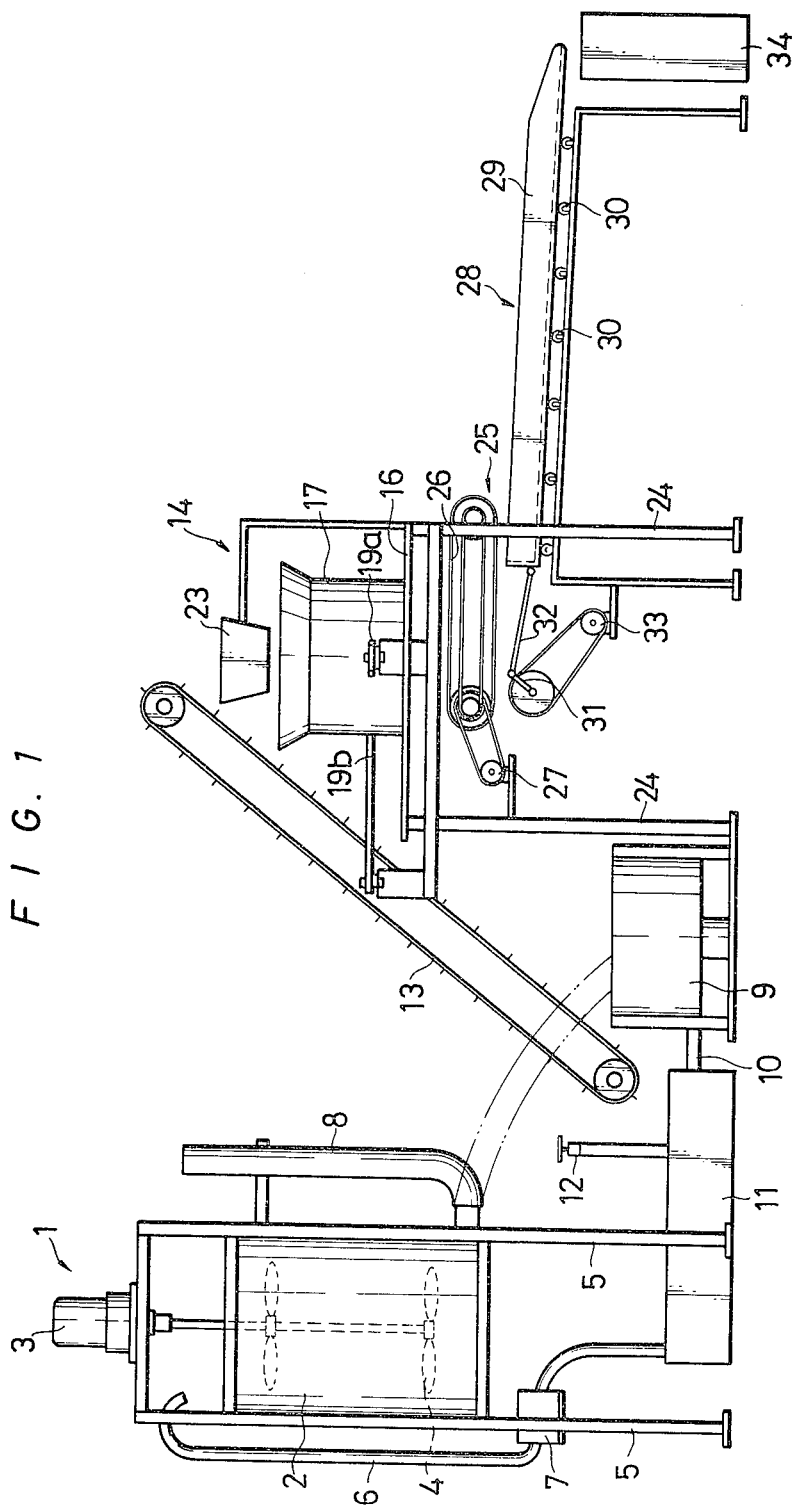
FIG. 1 is an elevation of the apparatus embodying this invention and particularly showing a front part of the apparatus.
Figure 2:
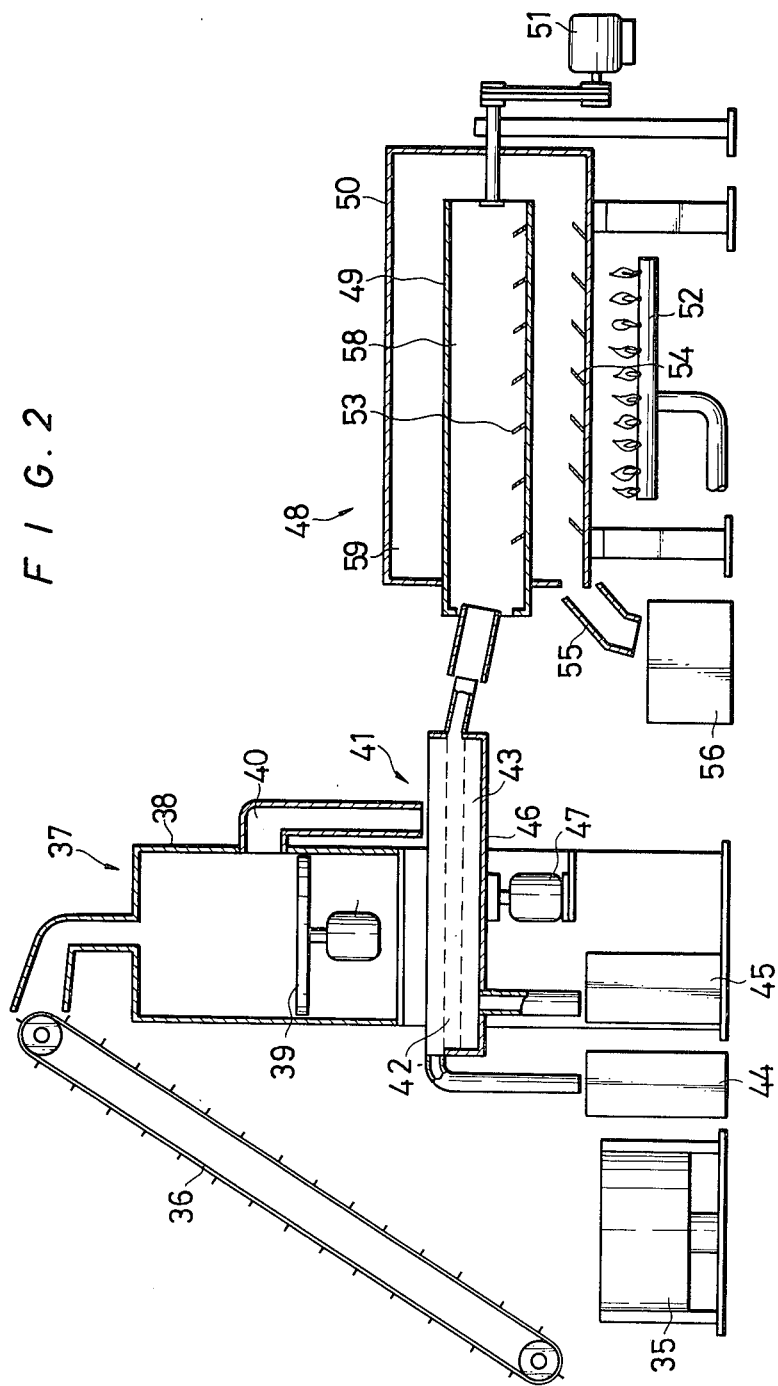
FIG. 2 is an elevation of the apparatus embodying this invention and particularly showing a rear part of the apparatus.

The process for the manufacture of paper pulp containing particles for the treatment of excrement relating to a preferred embodiment of this invention is performed by the apparatus illustrated in the drawings.

In FIG. 1, the first step is to add the platelike or lumplike paper pulp to hot water, and then a filler such as aluminum silicate or calcium carbonate, for example, feldspar, talc, limestone or the like is added at 10% to 40% of the weight of the paper pulp, and the paper pulp is loosened by the agitation whereby the slurry is formed.

In order to perform this process, an agitator 1 is provided, and the agitator comprises a cylindrical vessel 2, a motor 3 for agitation provided in the upper part of the vessel, and blades 4 to be rotated by the motor 3. The agitator 1 is supported by a column 5, and a pipe 6 for injecting hot water and a pump 7 are mounted, and moreover a pipe 8 for leading the slurry in the vessel 2 to a centrifugal separating machine 9 for the dehydration of the slurry.

Figure 3:
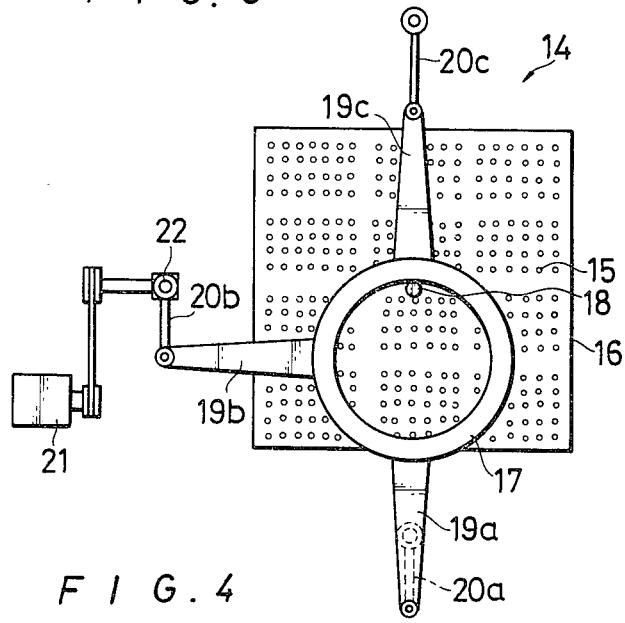
FIG. 3 is a plan showing a paper pulp separating machine.
Figure 4:
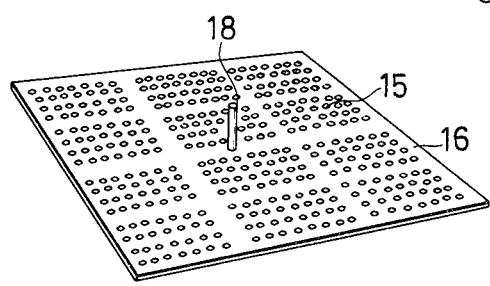
FIG. 4 is a perspective view of the metal plate of the paper pulp separating machine.
Figure 5:
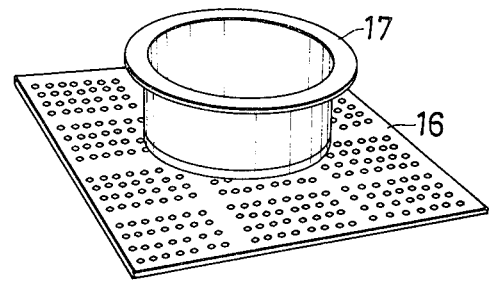
FIG. 5 is a perspective view of the paper pulp separating machine.

The slurry is placed in the centrifugal separating machine 9 to be dehydrated to attain pulp with a solid content of 15 to 25% by weight. The dehydration water is placed into a recycle pool 11 from a pipe 10, and is placed in the agitator 1 again. Reference numeral 12 denotes a pouring port for the supply of hot water. Next, the pulp lump dehydrated by the centrifugal separating machine 9 is loaded on a conveyor 13 to be placed into the separating machine 14. The separating machine 14 has a construction as illustrated in the drawings FIG. 3 through FIG. 5, and is designed to separate the pulp lump into particles.

The separating machine 14 comprises a metal plate 16 having with a large number of perforations 15 of circular shape whose diameter is about 5 to 18 mm or other shapes, and a moving cylinder to be mounted on the metal plate 16, and a bar 18 is erected in the center. The cylinder 17 is mounted on the metal plate 16, and arms 19a, 19b, 19c are projected in the lateral direction, and the arms 19a, 19b, 19c are coupled rotatably with rods 20a, 20b, 20c, and the other ends of the rods 20a, 20b, 20c are rotatably supported.

However, the rotating power of the motor 21 is transmitted to the other end of one rod 20b by the transmitting means, and the rod 20 is rotated centering around an axis 22 as a fulcrum. For this reason, the cylinder 17 is caused to make a big rotation while contacting the bar 18 by means of the arms 20a, 20b, 20c. On account of the bar 18, the pulp never becomes like the platelike, and can be dropped downwardly through the perforations 15 of the metal plate 16. Reference numeral 23 denotes a guide cylinder, and numeral 24 denotes a support base for supporting the metal plate 16 or the like.

In order to cause the paper pulp lump to form small lumps by means of the separating machine 14, the pulp lump is placed into the cylinder 17 continuously, and when the cylinder 17 is rotated on the metal plate 16 and rapidly rotated thereon, the pulp is forced into the perforations 15 at this time, and is cut, and is dropped as the small lumps into a receiving unit 25 in the lower part. This receiving unit 25 is comprised of an endless belt 26, and is caused to rotate loosely by a motor 27, and the pulp lump dropped and mounted thereon is transported to a first granulating machine 28 to be described hereinafter.

The first granulating machine 28 is constructed in such a way that rollers 30 are disposed at the lower end of a long boxlike granulating box 29, and one end thereof is connected to a rod 32 coupled with a crank 31, and the granulating box 29 is caused to reciprocate in right and left directions as the result of the rotation of the crank 31, which is driven by a motor 33, and the small lumps are molded into particles by the repeated inertial motion in the right and left directions. The granulating box 29 has an inclined portion, and the coarse particles are fed little by little, and are granulated and are dropped into an accommodating box 34.

The second dehydration of the coarse particles is performed by a centrifugal separating machine 35 until the pulp solid component is 28 to 45% by weight. This dehydration has the effect of improving the density of the particles in addition to saving of the fuel at the time of drying to be described hereinafter.

The coarse pulp containing particles which have been subjected to the second centrifugal separating operation are placed on the second granulating machine 37 by means of the belt conveyor 36 to increase their density and to produce particles which are not easily loosened.

Figure 6:
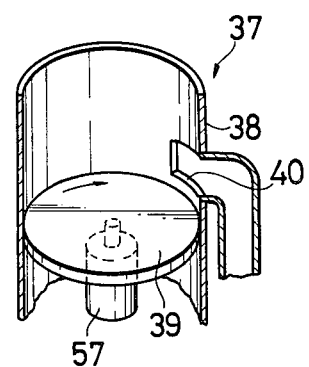
FIG. 6 is a cross section of an essential part of the second granulating machine.

The second granulating machine 37 is illustrated in FIG. 6, and the particles are caused to drop on a disc 39 by the rotating motor 57 in the cylindrical vessel 38, and the particles are rotated by the wall surface of the vessel 38, are dropped from overflow perforations 40, and are placed into a sorter 41 to which the vibration is applied in back and forth direction, and the selection of the particles are performed. The sorter 41 is constructed in such a way that nets 42, 43 whose meshes are different are provided in two stages in a box 46, and in the lower part, a motor 47 for vibrating the box 46 is mounted with its shaft being in eccentric condition.

The excessively large and small pulp lumps are individually separated by the separating machine 41, and are dropped into the accommodating box. The proper size pulp lumps are placed into the drier 48 and are dried. The dried particles whose solid content is more than 90% by weight are obtained by the drier 48. The drier 48 is of known type, and is comprised of an inside rotary body 49 and an outside rotary body 50, and are respectively rotated by a motor 51, and the heating is performed by a burner 52 in the lower part of the outside rotary body 50.

Figure 7:
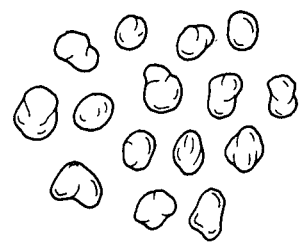
FIG. 7 is an elevation of paper pulp containing particles manufactured by this invention.

The particles from the second granulating machine 37 are initially placed in a rotary drying chamber 58 of the inside and gradually are fed by a feeding member 53 while being rotated, and are fed to the inside of a rotary drying chamber 59 of the outside, and are gradually fed by the feeding member 54 while being rotated, and are dried, and are accommodated in the accommodating chamber 56 by means of a guide 55. As described in the foregoing, the particles are manufactured. The particles are of structure shown in FIG. 7. The particles obtained in this invention can be used for the treatment of urine and stool of pets such as dogs and cats. Where the particles are used for such purpose, the particles manufactured in accordance with this invention are placed in the small size box, and the pet is caused to excrete thereon. In this case, the water content is seldom spread over the entire paper pulp contained particles in the box. For this reason, when one excrement is finished, only the stained portion is removed, and the fresh particles are added to be ready for the next excrement.

Since the particles obtained in this invention have water solubility, the particles on which the excrement is deposited can be flushed down the toilet.

The particles obtained in this invention have the effect of not sticking to the legs of the pet because of the addition of a filler such as feldspar.

What is claimed is:

1. A process for the manufacture of paper pulp containing particles for the treatment of excrement, which comprises:
   (a) adding hot water and a filler to a paper pulp in a solidified condition;
   (b) stirring to form a slurry of the paper pulp;
   (c) applying a first dehydration to the paper pulp slurry so that the paper pulp solids content becomes 15 to 20% by weight, thereby forming lumps of paper pulp;
   (d) forming said paper pulp lumps into a plurality of smaller lumps;
   (e) rolling the smaller lumps to and fro repeatedly so that the respective smaller lumps form coarse particles;
   (f) applying a second dehydration to the coarse particles so that their solids content becomes 28 to 45% by weight of the particle;
   (g) rotating the dehydrated particles; and
   (h) drying the particles so that the solids content becomes more than 90% by weight of the particle.

2. A process as recited in claim 1, further including the step of rejecting any particles which are non-conforming, after step (g).

3. A process as recited in claim 1 or 2, wherein said filler is selected from the group consisting of aluminum silicate and calcium carbonate.

* * * * *